United States Patent
Wagh et al.

(10) Patent No.: US 6,498,119 B2
(45) Date of Patent: Dec. 24, 2002

(54) CHEMICALLY BONDED PHOSPHATE CERAMICS OF TRIVALENT OXIDES OF IRON AND MANGANESE

(75) Inventors: Arun S. Wagh, Orland Park, IL (US); Seung-Young Jeong, Westmont, IL (US)

(73) Assignee: University of Chicago, Chicago, IL (US)

( * ) Notice: Subject to any disclaimer, the term of this patent is extended or adjusted under 35 U.S.C. 154(b) by 0 days.

(21) Appl. No.: 09/751,655

(22) Filed: Dec. 29, 2000

(65) Prior Publication Data

US 2002/0123422 A1 Sep. 5, 2002

(51) Int. Cl.[7] .............................................. C04B 35/447
(52) U.S. Cl. ........................ 501/111; 501/112; 501/155; 588/10; 588/252; 588/256
(58) Field of Search ................................ 501/155, 111, 501/112; 588/10, 252, 256

(56) References Cited

U.S. PATENT DOCUMENTS 6,133,498 A  * 10/2000  Singh et al. .................... 588/3

FOREIGN PATENT DOCUMENTS

| JP | 11104593 | * | 4/1999 |
| JP | 11278849 | * | 10/1999 |
| SU | 541 853 | * | 1/1977 |

OTHER PUBLICATIONS

"Novel Technique for Direct Steel Marking Process by Molten Phase Reduction of Iron Ore" Lupietko Stal (2000), 9, 15–19.*

"Direct Recovery of Metals from Loaded Organic Solvents" A Review of Recent Methodologies Abrantes et al. Aqueous Electrotechnol. Proc Symp. (1997), 217–228.*

* cited by examiner

*Primary Examiner*—Paul Marcantoni
(74) *Attorney, Agent, or Firm*—Cherskov & Flaynik

(57) ABSTRACT

A new method for combining elemental iron and other metals to form an inexpensive ceramic to stabilize arsenic, alkaline red mud wastes, swarfs, and other iron or metal-based additives, to create products and waste forms which can be poured or dye cast.

19 Claims, 2 Drawing Sheets

Potential-pH diagram for Fe - $Fe_2O_3$ - $H_2O$ system

Fig. 1. Potential-pH diagram for Fe - $Fe_2O_3$ - $H_2O$ system

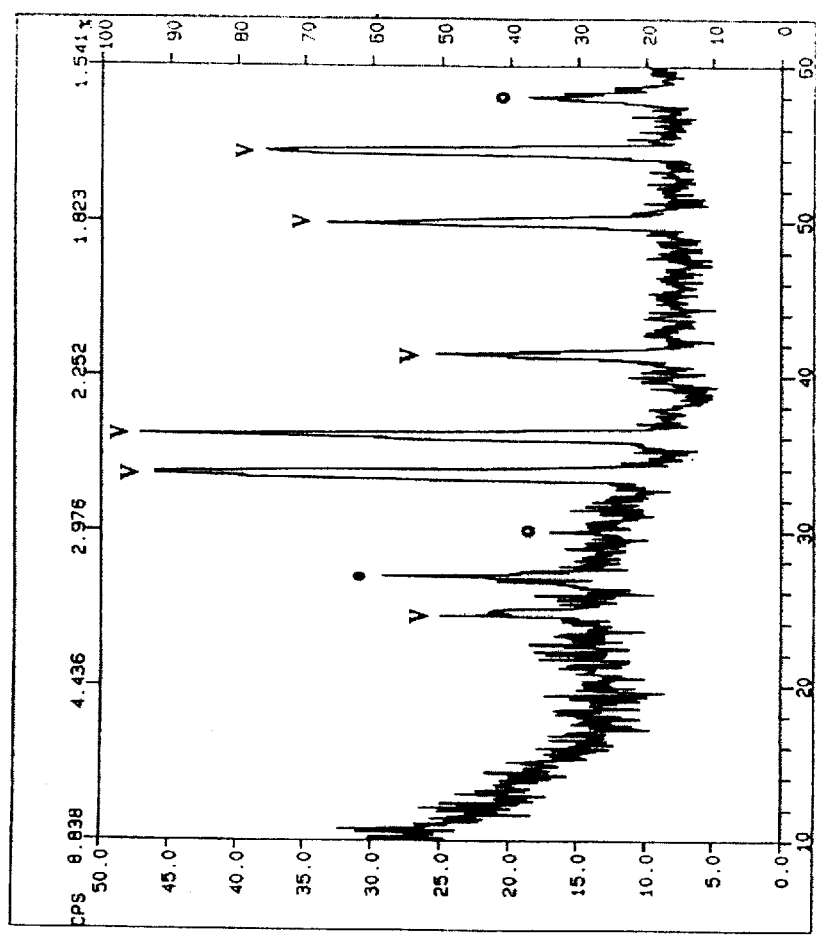
Fig. 2. X-ray diffraction pattern of Fe-phosphate made with 1 wt.% Fe. Symbols for the peaks are, V for haematite, ● for quartz, and o for magnetite.

CHEMICALLY BONDED PHOSPHATE CERAMICS OF TRIVALENT OXIDES OF IRON AND MANGANESE

CONTRACTUAL ORIGIN OF INVENTION

The United States Government has rights in this invention pursuant to Contract No. W-31-109-ENG-38 between the U.S. Department of Energy and the University of Chicago, representing Argonne National Laboratory.

BACKGROUND OF THE INVENTION

1. Field of the Invention

The invention relates to a method for forming chemically bonded phosphate ceramics (CBPCs) of metal oxides and more specifically, this invention relates to a method for using trivalent oxides of metals to create a ceramic.

2. Background of the Invention

Haematite, having the chemical formula $Fe_2O_3$, is one of the most abundant minerals in nature. It exists as iron ore, in other minerals such as bauxite, and is also a component in clay minerals. It is the major component in laeritic soils (red soils found in the tropics). Similarly, manganese oxide, having a formula $Mn_2O_3$ is also a very common component in several lateritic soils and also exists as a mineral of manganese in the tropics.

When iron rusts, haematite is produced. Haematite also exists in metal machining wastes called swarfs, and in slags from steel industry. Iron mine tailings, containing haematite, are the most voluminous wastes that occupy land and pollute air with their dust. Thus haematite is abundant as a mineral as well as a waste and is a very inexpensive raw material. If a method is developed to bind haematite powder at ambient temperature by chemical reactions to form ceramics, the ensuring structural products can be very cost effective. This is particularly relevant in light of rising metal prices due to exhaustion of ore sites, and energy costs. This is because such a process will reduce energy consumption in the production of sintered structural products such as construction products and components.

Typically, tin chloride ($SnCl_2$) or FeS are used to reduce haematite to iron oxides such as magnetite ($Fe_3O_4$) or to worstite (FeO). For example, U.S. Pat. No. 6,133,498 issued to Singh et al. on Oct. 17, 2000 disclosed a method to produce chemically bonded phosphate ceramics for stabilizing contaminants encapsulated therein utilizing reducing agents. The iron oxide is then reacted with phosphoric acid solution to form ceramics.

These reducing agents have their drawbacks. First, tin chloride is very corrosive. Its chloride anions released in the reacted slurry tend to interfere with the setting reaction, thereby weakening the product. Also, the amount of tin chloride that needs to be added is a relatively high 5 wt.% of the total amount of haematite powder used. With its high cost, this component raises the cost of the product significantly so that any advantages of lower costs of the haematite are lost.

FeS releases sulfur dioxide ($SO_2$), which is an atmospheric pollutant. The gaseous $SO_2$ also generates additional porosity in the material and therefore weakens it. Furthermore, like tin chloride, FeS can be costly, resulting in a more expensive product. The '498 patent does not provide an alternative to the use of $SnCl_2$ and/or FeS.

The U.S. Pat. Nos. 5,645,518 and 5,830,815 issued to Wagh et al. on Jul. 8, 1997 and Nov. 3, 1998, respectively, disclose processes for utilizing phosphate ceramics to encapsulate waste. U.S. Pat. No. 5,846,894 issued to Singh et al. on Dec. 8, 1998 discloses a method to produce phosphate bonded structural products from high volume benign wastes. None of these patents provides a method for utilizing the waste materials of iron and manganese.

A need exists in the art for a method to produce low cost structural products using inexpensive iron and manganese oxides. These oxides would be available either as waste materials or as natural minerals and the ceramics generated therewith could be used to encapsulate metal wastes that require reduction environments such as hazardous materials (e.g. chromium and arsenic), fission products such as technetium wastes and low-level radioactive materials. The method should result in the formation of a durable and chemically stable ceramic. Also, the method should utilize inexpensive and commonly available reactants to produce low cost ceramics.

SUMMARY OF INVENTION

An object of the present invention is to provide a method of producing chemically bonded phosphate ceramics (CBPCs) that overcomes many of the disadvantages of the prior art.

Another object of the present invention is to provide a room temperature, non-toxic method for incorporating trivalent metal oxides in a ceramic. A feature of the invention is that elemental metal, or minerals and waste oxides containing the elemental metal, can be used to reduce the oxides. An advantage is that the oxide materials are abundant and therefore inexpensive.

It is another object of the present invention to provide a method of reducing haematite that does not use expensive, corrosive or polluting materials. A feature of the invention is that elemental iron is used to reduce haematite to more soluble species. An advantage of this feature is that the species can be utilized as a ceramic binder to encapsulate hazardous and radioactive waste.

Briefly, the process provides a method for forming ceramics from metal oxide, the process comprising supplying a mixture of elemental metal and the oxide, reacting the mixture with acid, and adding a retardant to the mixture to slow the setting rate.

Also provided is a method for stabilizing hazardous and radioactive waste by the formation of CBPC's and incorporating the waste materials in either the haematite powder compositions or in the phosphoric acid solutions.

Finally, a method is provided for retarding the setting rate of Ferroceramicrete so as to facilitate its use in industrial settings.

BRIEF DESCRIPTION OF THE DRAWING

The invention together with the above and other objects and advantages will be best understood from the following detailed description of the preferred embodiment of the invention shown in the accompanying drawing, wherein:

FIG. 2 is a typical X-ray diffraction pattern of a haematite ceramic.

DETAILED DESCRIPTION OF THE INVENTION

Figure 1:
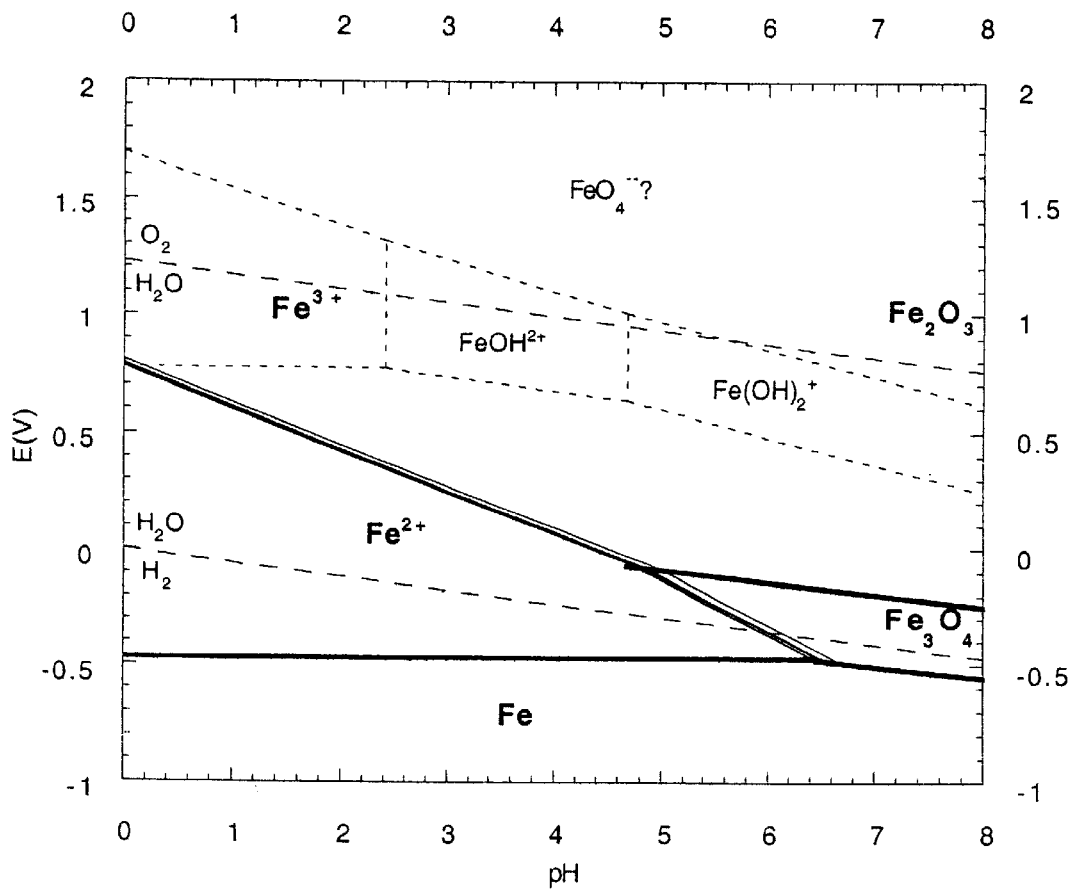
FIG. 1 is a diagram depicting suitable pH ranges to practice the invented process, in accordance with features of the present invention.

A process is provided to encapsulate metal oxides. The general process comprises mixing haematite, elemental metal, acid, and a material such as fly ash or sand to effect the reaction sequence illustrated in Equation 2. In one instance, elemental iron powder is used as a reducing agent in place of $SnCl_2$, FeS, or other typical moieties. Elemental metal content of only about 1 wt.% is needed to obtain optimum strength properties.

A slurry forms and sets very rapidly into a ceramic having a compressive strength similar to that of Portland cement (i.e., approximately 4000 psi, the middle of the range for "regular strength" Portland cement). Addition of a retardant can lengthen the initial setting time to 24 hours, so that most of the setting or curing takes place over three days. The significantly longer setting time makes the process disclosed herein of industrial utility because the slurry can then be poured or cast into molds and thus more easily handled. This entire process can occur at room temperature.

The inventors have elucidated and exploited the following chemistry in this invented method: $M_2O_3$ (wherein M represents a metal such as iron or manganese) is a very stable oxide and cannot be dissolved sufficiently in an acid solution. However, $M_2O_3$ could be converted to MO, or $M_3O_4$ the latter of which is a combination of MO and $M_2O_3$, which produces $M^{2+}$. The enhanced solubility of these reduced moieties assures rapid dissociation in acid. The above described mechanism can be used to develop inexpensive Ferroceramicrete. The following reaction equations show the possible results from the dissolution of the iron species as $Fe^{2+}$:

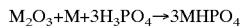
$$M_2O_3 + M + 3H_3PO_4 \rightarrow 3MHPO_4 \quad \text{Equation 1}$$

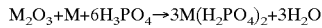
$$M_2O_3 + M + 6H_3PO_4 \rightarrow 3M(H_2PO_4)_2 + 3H_2O$$

where M is a metal such as iron or manganese. Both $MHPO_4$ and $M(H_2PO_4)_2$ are binder components. For example, iron binder can be formed by adding Fe to haematite and then reacting it with phosphoric acid solution. In the acidic solution, the elemental metal will dissolve by releasing electrons, and form metal cations. Release of these electrons is the basis of a reducing environment. Equations 2 and 3 indicate that one mole of metal will convert one mole of $M_2O_3$ to form 3 moles of binder. Further, one gram of $M_2O_3$ converts 8 to 13.5 grams of the binder, depending on how much of each of the iron or manganese hydro phosphates are formed. In practice, as the pH of the slurry increases, $Fe(H_2PO_4)_2$ will convert to $FeHPO_4$ as per the following reaction, which can occur without the addition of heat.

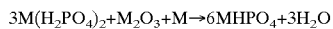
$$3M(H_2PO_4)_2 + M_2O_3 + M \rightarrow 6MHPO_4 + 3H_2O$$

Equation 3 shows that a fully cured ceramic will form $MHPO_4$ as the binder, provided a reducing environment is maintained.

FIG. 1 is a reduction potential/pH diagram for an Fe—$Fe_2O_3$—$H_2O$ system of the type discussed supra. It illustrates that suitable ceramics can be formed with iron cations at a pH of from approximately 0 to 6.5. It also shows that usable concentrations of $Fe^{2+}$ exist at moderate oxidizing and reducing potentials. The long diagonal bold line is the rough boundary between $Fe^{2+}$ and $Fe^{3+}$. $Fe_2O_3$ exists, as illustrated, above the highest dashed line in a moderately strong oxidizing environment and slightly alkaline pH. The diagram pertaining to other metals, such as manganese is easily determined. In fact, the diagram and logic for use of manganese is very similar and thus not reproduced here.

PROCESS DETAIL

EXAMPLE 1
Formation of iron phosphate ceramic using haematite.

A mixture of haematite and phosphoric acid reacts too quickly when a small amount of iron is present. A better mixture that requires a few minutes of mixing occurs when Class F fly ash is added to the reacting mixture. Generally adding between 0 wt. % and 80 wt. % of fly ash to the mixture is suitable. In this example, 22 wt. % of haematite (between 100 and 200 mesh were mixed with 0.18 wt. % of iron powder and 45 wt. % of Class F fly ash. This mixture was added to 33 wt. % of 40 wt. % concentrated phosphoric acid solution. The slurry was mixed for 3 minutes when it self-heated via an exothermic reaction and hardened into a solid. One mixture was also made which was 22 wt. % haematite and 0.36 wt. % iron. Still another mixture was 22 wt. % haematite and 0.54 wt. % iron. In each case the slurry set after 3 minutes of mixing. These samples were cured for 3 weeks in air and their properties were measured. The results are given in TABLE 1.

TABLE 1

Properties of haematite ceramic. In all cases, 45 wt. % of Class F fly ash and 33 wt. % of $H_3PO_4$ solution were used to every 23 wt. % of the mixture of $Fe_2O_3$ and Fe. The concentration of $H_3PO_4$ solution was 40 wt. %.

| $Fe_2O_3$: Fe (Wt. Ratio) | Density (g/cm³) | Porosity (vol. %) | Compressive strength (psi) |
| --- | --- | --- | --- |
| $Fe_2O_3$: Fe = 49:1 | 1.7 | 19.9 | 3699 ± 52 |
| $Fe_2O_3$: Fe = 48:2 | 1.7 | 18.6 | 3237 ± 460 |
| $Fe_2O_3$: Fe = 47:3 | 1.52 | 21.2 | 3263 ± 517 |

The data in TABLE 1 shows that the compressive strength of the ceramic is very similar to that of Portland cement. A lower iron content allows for better strength. The porosity is high as in the conventional cement. The material cost in manufacturing of the product here is $0.04 per pound which is very close to the cost per pound of Portland cement. Thus the composition here gives a red cement with a cost basis and characteristics similar to those of Portland cement.

FIG. 2 shows a typical X-ray diffraction pattern of this ceramic. Apart from the unreacted haematite ("v"), and quartz ("•") from the ash, there is also a peak (designated as "o") for magnetite ($Fe_3O_4$). This indicates that the reduction mechanism has resulted in formation of magnetite in the ceramic which releases $Fe^{2+}$ ions and forms ceramic.

EXAMPLE 2
Dye cast haematite ceramic.

Haematite was mixed thoroughly with an approximately equal weight of sand. Approximately 0.6 wt. % of iron powder were added to this mixture followed by the addition of approximately 3.5 to 4 wt. % of 85 wt. % concentrated phosphoric acid solution and 8 to 10 wt. % of water. The entire mixture was mixed for a few minutes and was then cast into a brick in a brick mold by applying a pressure of 1000 psi. When taken out of the mold, it was hard and set well after a day. The cost of the phosphoric acid in the brick was only $0.01 per pound of brick.

EXAMPLE 3
Red mud ceramic.

Red mud is a highly alkaline waste resulting from the Bayer process extraction of alumina from bauxite. It is rich in haematite and hence may be used as a raw material for forming iron phosphate ceramics. A red mud brick was made by dye-casting it. Sand was added to an approximately equal weight of red mud which had a water content of 30 wt. %. The red mud and sand were mixed in a mixer capable of forming a uniform consistency of moldable clay. In one instance, a table top mixer was utilized to generate a mixture having a viscosity of approximately 200 cp (centipoise). Approximately 12.5 wt. % of 85 wt. % of concentrated $H_3PO_4$ were then added. After mixing for five minutes, the pH of the resulting solution was 3.11. Approximately 0.18 wt. % of iron was then added and the entire slurry mixed for 25 minutes. A thick mass formed which was pressed at a pressure of 1000 psi in a brick mold. The resulted pressed mass hardened into a solid brick in approximately two days. For this composition, the cost of the acid in the brick was only $0.033 per pound of brick.

Drying red mud prior to making bricks and blocks is a very expensive process. However, the invented process requires no dewatering, and no extra water was added except for a few drops while dye casting. Rather, the in situ water from the red mud was used.

EXAMPLE 4

Swarf ceramic.

Swarfs are machining wastes containing iron in them. In storage, they oxidize and form magnetite and haematite. While they are pyrophoric wastes and hence are a liability, they are ideal raw materials for forming iron phosphate ceramics. This is because the wastes contain a small amount of elemental iron that has not rusted, and they also contain different iron oxide forms that include haematite and magnetite.

The swarf waste utilized in this example was a fine ground black material containing traces of machining oil. This powder (comprising from 70 to 80 wt. %) was mixed with from 10 to 16 wt. % of waste phosphoric acid. Small amounts of Fe and $Fe_2O_3$ were also added to some samples. TABLE 2 gives the composition used herein in forming ceramics. In all cases, the ingredients were mixed only for a few minutes, and the mixture was transferred into a plastic mold and was pressed at 1000 psi and kept under pressure for 10 minutes. When each sample was taken out, it had hardened. Each sample was cured for 21 days and compression strengths were measured. As TABLE 2 indicates all samples harden when 10 to 15 wt. % phosphoric acid is mixed to form the paste. The compression strengths, except for composition 1, are almost 2000 psi, which is equal to that of a fired brick. As shown by composition 2, the best strength is obtained when a small amount of $Fe_2O_3$ is added. The results show that iron present in the waste helps produce a hardened ceramic. The ranges of the components in the swarf ceramic can be very broad. The swarf can vary up to approximately 80 wt. %. The haematite concentration can vary from 0 wt. % to 90 wt. % since iron (III) oxide or haematite is the main component anyway. Whatever the total of the swarf and haematite weight percentages is, the remainder is taken up by 85 wt. % $H_3PO_4$, and iron.

TABLE 2

Compositions used in swarf solidification and their compressive strengths.

| Sample No. | Compositions (wt. %) | | | |
|---|---|---|---|---|
|  | 1 | 2 | 3 | 4 |
| Swarf | 69.6 | 69.6 | 74 | 78.3 |
| $Fe_2O_3$ | 7.8 | 8.7 |  |  |
| Fe |  | 0.9 |  |  |
| 85 wt. % $H_3PO_4$ | 10.2 | 10.2 | 15.2 | 10.2 |
| $H_2O$ | 11.5 | 11.5 | 10.8 | 11.5 |
| Compressive strength (psi) | 972 ± 2 | 2345 ± 311 | 1937 ± 92 | 1800 ± 459 |

In all the aforementioned examples, the setting of the ceramic has been rapid. After mixing the slurry only for three to five minutes, the slurry solidifies rapidly into a hard ceramic. This rapid setting may not allow sufficient time for good mixing of the slurry components, and in addition, may not provide sufficient processing time (such as pumping and mixing times) for large scale production of a ceramic. In order to slow down the reaction, the inventors have found that the addition of less than 1 wt. % of boric acid ($H_3BO_3$) in the Ferroceramicrete powder allows a mixing time of at least 20 minutes. That was the situation in example 5, below.

EXAMPLE 5

Retardation of setting reaction

Approximately 22 wt. % of $Fe_2O_3$, 0.45 wt. % of Fe, 45 wt. % of Class F fly ash, 0.35 wt. % of boric acid were mixed with 33 wt. % of 40 wt. % concentrated phosphoric acid solution. The resulting slurry was mixed for 20 minutes. Within the first 3 minutes, the slurry warmed up. The mixing was continued for a total period of 20 minutes. The slurry was then stored in an enclosed container. It set into a hard ceramic within 24 hours.

In another experiment, the same composition was used, but the boric acid content was increased to approximately 0.70 wt. %. Again, initially the slurry warmed up, then cooled. It was mixed for 20 minutes and left for curing. The next day it had set, but the surface was tacky indicating that setting was not complete, but may be complete in a few days. The longer setting time allows for processing of the slurry such as pouring it into molds. The final total setting time was three days.

Generally, aside from the specific acids, retardants and wastes utilized in the above examples, other moieties are also suitable. For example, liquid or solid phase acids are suitable for use in the invented method, including, but not limited to aqueous phosphoric acid (at between 30 weight percent and 85 weight percent concentration) or solid phosphorous pentoxide with equivalent phosphate content.

As for the retardant, boric acid, borax, sodium tripolyphosphate, sodium sulfonate, citric acid and many commercial retardants utilized in the cement industry are suitable. These retardants can be present in weight percents of between 0.1 to 5 weight percent of the total ceramic mixture, up to 2 weight percent in a preferred concentration, and between 0.5 and 1 weight percent in a most preferred range.

A myriad of wastes also can be encapsulated by the invented method and ceramic. Generally, any waste requiring reducing environment for stability is particularly suitable. As such, hazardous metals are good candidates, including, but not limited to arsenic, chromium, lead, nickel, and zinc. Fission products are also good waste substrate candidates, including technetium, strontium, barium and cesium. Low level wastes, such as biomedical materials and other slightly radioactive substrates are suitable encapsulation candidates. Even heterogeneous wastes and mixed phase wastes are suitable.

While the invention has been described with reference to details of the illustrated embodiment, these details are not intended to limit the scope of the invention as defined in the appended claims.

What is claimed is:

1. A room temperature process for producing ceramics, the process comprising:
    a) mixing elemental iron and haematite to create a mixture wherein the elemental iron is present at about 1 weight percent; and
    b) reacting the mixture with phosphoric acid.

2. The process as recited in claim 1 wherein the metal oxide is a trivalent oxide selected from the group consisting of $Fe_2O_3$, $Mn_2O_3$, or combinations thereof.

3. The process as recited in claim 1 wherein the oxide is derived from wastes selected from the group consisting of iron mine tailings, manganese mine tailings, red mud, swarfs, lateritic soils, or combinations thereof.

4. The process as recited in claim 3 wherein one part of iron oxide will produce up to 15 parts of iron hydrophosphate binder.

5. The process as recited in claim 3 wherein the swarf component comprises up to approximately 80 wt. % of the ceramic.

6. The process as recited in claim 3 wherein up to 90 weight percent of the swarf is haematite.

7. The process as recited in claim 2 wherein iron comprises up to 5 weight percent of the ceramic.

8. The process as recited in claim 2 wherein iron comprises between 0.5 and 1 weight percent of the ceramic.

9. The process as recited in claim 1 wherein the acid is 85 wt. % phosphoric acid present at from 10 wt. % to 20 wt. % of the ceramic.

10. The process as recited in claim 2 wherein 1 part of manganese (III) oxide will produce 13 parts of manganese hydrophosphate binder.

11. The process as recited in claim 1 wherein a retardant is added to the mixture to slow the setting time of the mixture.

12. The process as recited in claim 1 wherein waste is incorporated into the ceramic.

13. The process recited in claim 12 wherein the waste is hazardous material selected from the group consisting of high level radioactive wastes, low-level radioactive wastes, heavy metals, fission products, or combinations thereof.

14. The process recited in claim 12 wherein the waste requires a reduction environment for stability.

15. A room temperature process for producing ceramics from haematite, the process comprising:
   a) combining elemental iron and haematite to create a mixture wherein the elemental iron is present at about 1 weight percent;
   b) reacting the mixture with phosphoric acid ; and
   c) adding a retardant to the reaction mixture in an amount sufficient to slow the setting time of the mixture.

16. The process as recited in claim 15 wherein the retardant is selected from the group consisting of boric acid, borax, sodium tripolyphosphate, sodium sulfonate, citric acid or combinations thereof.

17. The process as recited in claim 15 wherein the concentration of the retardant ranges from 0.1 to 5 wt. % of the ceramic.

18. A room temperature process for producing ceramics from red mud, the process comprising:
   a) combining elemental iron and the red mud to create a mixture;
   b) adding sand to the mixture at a weight approximately equal to the red mud, and wherein the elemental iron is present at about 1 weight percent; and
   c) reacting the mixture with acid.

19. The process as recited in claim 18 wherein the red mud requires no dewatering.

* * * * *